US009749240B2

(12) United States Patent
Mibu

(10) Patent No.: US 9,749,240 B2
(45) Date of Patent: Aug. 29, 2017

(54) COMMUNICATION SYSTEM, VIRTUAL MACHINE SERVER, VIRTUAL NETWORK MANAGEMENT APPARATUS, NETWORK CONTROL METHOD, AND PROGRAM

(71) Applicant: NEC Corporation, Minato-ku, Tokyo (JP)

(72) Inventor: Ryota Mibu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 127 days.

(21) Appl. No.: 14/437,752

(22) PCT Filed: Oct. 23, 2013

(86) PCT No.: PCT/JP2013/078684
§ 371 (c)(1),
(2) Date: Apr. 22, 2015

(87) PCT Pub. No.: WO2014/065315
PCT Pub. Date: May 1, 2014

(65) Prior Publication Data
US 2015/0263954 A1  Sep. 17, 2015

(30) Foreign Application Priority Data
Oct. 24, 2012 (JP) .................. 2012-234557

(51) Int. Cl.
*H04L 12/28* (2006.01)
*H04L 12/743* (2013.01)
(Continued)

(52) U.S. Cl.
CPC ...... *H04L 45/7453* (2013.01); *H04L 12/4641* (2013.01); *H04L 49/70* (2013.01)

(58) Field of Classification Search
CPC .. H04L 12/4641; H04L 45/7453; H04L 49/70
See application file for complete search history.

(56) References Cited

U.S. PATENT DOCUMENTS

2011/0035494 A1* 2/2011 Pandey ................. G06F 9/5077
709/224
2013/0086236 A1* 4/2013 Baucke .................. H04L 45/50
709/223

FOREIGN PATENT DOCUMENTS

| JP | 2011-081588 A | 4/2011 |
| WO | 2008/095010 A1 | 8/2008 |
| WO | 2011/037104 A1 | 3/2011 |

OTHER PUBLICATIONS

IEEE Std. 802.1Q-2005, "Virtual Bridged Local Area Networks.", ISBN 0-7381-3662-X, 2006.
(Continued)

*Primary Examiner* — Kan Yuen

(57) ABSTRACT

Each virtual machine server includes: means for generating, when a virtual machine is connected to a virtual network via a virtual network management apparatus, local identification information unique per virtual switch and setting the local identification information as a VLAN ID of a port of a virtual switch, the port having been connected to the virtual machine; and means for notifying the virtual network management apparatus of a correspondence relationship between the virtual network to which the virtual machine has been connected and the local identification information. The virtual network management apparatus instructs, on the basis of the notification, the switch control apparatus to control the virtual network by using the local identification information unique per virtual switch as a match condition.

17 Claims, 13 Drawing Sheets

(51) Int. Cl.
*H04L 12/931* (2013.01)
*H04L 12/46* (2006.01)

(56) References Cited

OTHER PUBLICATIONS

"OpenStack Compute Administration Manual", Internet <URL: http://docs.openstack.org/trunk/openstack-compute/admin/bk-compute-adminguide-trunk.pdf>, Sep. 17, 2012.
Nick McKeown, and seven others, "OpenFlow: Enabling Innovation in Campus Networks", Internet URL:http://www.openflow.org/documents/openflow-wp-latest.pdf, Mar. 14, 2008.
"OpenFlow Switch Specification" Version 1.1.0 Implemented (Wire Protocol 0x02), Internet <URL:http://www.openflow.org/documents/openflow-spec-v1.1.0.pdf>, Feb. 28, 2011.
International Search Report for PCT Application No. PCT/JP2013/078684, mailed on Jan. 28, 2014.

* cited by examiner

FIG. 7

| VIRTUAL SWITCH | VIRTUAL NETWORK | LOCAL IDENTIFICATION INFORMATION (VLAN ID) |
|---|---|---|
| 12a | 1 | 1 |
| 12a | 2 | 2 |
| 12a | 3 | 3 |
| 12a | 4 | 4 |
| 12a | .. | .. |
| 12a | 4094 | 4094 |
| .. | .. | .. |

FIG. 8

| VIRTUAL SWITCH | VIRTUAL NETWORK | LOCAL IDENTIFICATION INFORMATION (VLAN ID) |
|---|---|---|
| 12b | 1 | 1 |
| 12b | 2 | 2 |
| 12b | 5 | 3 |
| 12b | 3 | 4 |
| 12b | .. | .. |
| 12b | 8188 | 4094 |
| .. | .. | .. |

FIG. 11

| VIRTUAL SWITCH | VIRTUAL NETWORK | LOCAL IDENTIFICATION INFORMATION (VLAN ID) |
|---|---|---|
| 12a | 0x1 | 1 |
| 12a | 0x3 | 3 |
| 12a | .. | .. |
| 12a | 0x1001 | 2 |
| .. | .. | .. |

FIG. 13

| VIRTUAL SWITCH | VIRTUAL NETWORK | LOCAL IDENTIFICATION INFORMATION (VLAN ID) |
|---|---|---|
| 12a | 0x1 | Hash(0x01) |
| 12a | 0x3 | Hash(0x03) |
| 12a | .. | .. |
| 12a | 0x1001 | Hash(0x1001) |
| .. | .. | .. |

COMMUNICATION SYSTEM, VIRTUAL MACHINE SERVER, VIRTUAL NETWORK MANAGEMENT APPARATUS, NETWORK CONTROL METHOD, AND PROGRAM

This application is a National Stage Entry of PCT/JP2013/078684 filed on Oct. 23, 2013, which claims priority from Japanese Patent Application 2012-234557 filed on Oct. 24, 2012, the contents of all of which are incorporated herein by reference, in their entirety.

TECHNICAL FIELD

Reference to Related Application

The present invention is based upon and claims the benefit of the priority of Japanese patent application No. 2012-234557, filed on Oct. 24, 2012, the disclosure of which is incorporated herein in its entirety by reference thereto.

The present invention relates to a communication system, a virtual machine server, a virtual network management apparatus, a network control method, and a program. In particular, it relates to: a communication system that provides virtual networks by using virtualization technology; a virtual machine server; a virtual network management apparatus; a network control method; and a program.

BACKGROUND

Development of cloud infrastructure for providing users with machines, networks, etc. as virtual resources (which is also referred to as Infrastructure as a Service (IaaS) has been in progress. A virtual local area network (VLAN) in NPL 1 is generally used to realize a virtual network in cloud infrastructure.

In such VLAN, a network can be used as a plurality of virtual networks by adding a virtual network identifier to each packet. NPL 1 defines that each virtual network identifier is encoded in a 12-bit field and takes a value in the range 1 through 4094 in which reserved 0x0 and 0xfff are not included.

In cloud infrastructure, by using such VLAN, a virtual network can be configured as follows. First, when a user defines a virtual network, the user allocates a VLAN ID unique in the whole system. Next, a switch or a hypervisor sets a port to which a virtual machine (VM) is connected so that the VM belongs to the allocated VLAN when the VM is started.

After a packet outputted from the VM is provided with the VLAN ID at the port, the packet is forwarded to a port that belongs to the same virtual network. The VLAN ID is deleted at an exit node, and the packet is forwarded to a destination. Since such VLAN ID unique in the whole system is allocated, the maximum number of virtual networks that can be used is 4094.

NPL 2 is an administration manual for cloud infrastructure software referred to as "Open Stack." Pages 151 to 154 in NPL 2 describe a VLAN mode in cloud infrastructure. More specifically, section "Configuring VLAN Networking" on page 151 describes that each subnet (a virtual network) has a different VLAN tag (VLAN ID). The middle part on page 152 illustrates an example of a command for generating a subnet (a virtual network) specifying 169 as a VLAN ID. In addition, the last paragraph on page 152 describes that, instead of manually specifying a VLAN ID, bridge, and project ID, a user can select automatic allocation by using a command.

In addition, in recent years, a technique referred to as OpenFlow has been proposed (see PTL 1 and NPLs 3 and 4). OpenFlow recognizes communications as end-to-end flows and performs path control, failure recovery, load balancing, and optimization on a per-flow basis. Each OpenFlow switch according to NPLs 3 and 4 has a secure channel for communication with an OpenFlow controller and operates according to a flow table suitably added or rewritten by the OpenFlow controller. In the flow table, a set of the following three is defined for each flow: match conditions (Match Fields) against which a packet header is matched; flow statistical information (Counters); and instructions that define at least one processing content (see section 4.1 "Flow Table" in NPL 4).

For example, when an OpenFlow switch receives a packet, the OpenFlow switch searches the flow table for an entry having a match condition (see 4.3 "Match Fields" in NPL 4) that matches header information of the received packet. If, as a result of the search, the OpenFlow switch finds an entry that matches the received packet, the OpenFlow switch updates the flow statistical information (Counters) and processes the received packet on the basis of a processing content(s) (packet transmission from a specified port, flooding, dropping, etc.) written in the Instructions field of the entry. If, as a result of the search, the OpenFlow switch does not find an entry that matches the received packet, the OpenFlow switch transmits an entry setting request to the OpenFlow controller via the secure channel. Namely, the OpenFlow switch requests the OpenFlow controller to transmit control information for processing the received packet (Packet-In message). The OpenFlow switch receives a flow entry that defines a processing content(s) and updates the flow table. In this way, by using an entry stored in the flow table as control information, the OpenFlow switch performs packet forwarding.

Example 2 in NPL 3 describes that virtual networks can be established by combining the above Open Flow switches and Open Flow controller and using VLAN IDs as in VLANs.

PATENT LITERATURE (PTL)

PTL 1: WO2008/095010A1

NON PATENT LITERATURE (NPL)

NPL 1: IEEE Std. 802.1Q-2005, "Virtual Bridged Local Area Networks.", ISBN 0-7381-3662-X.
NPL 2: "OpenStack Compute Administration Manual," [online], [searched on Oct. 18, 2012], Internet <URL: http://docs.openstack.org/trunk/openstack-compute/admin/bk-compute-adminguide-trunk.pdf>
NPL 3: Nick McKeown, and seven others, "OpenFlow: Enabling Innovation in Campus Networks," [online], [searched on Oct. 18, 2012], Internet <URL:http://www.openflow.org/documents/openflow-wp-latest.pdf>
NPL 4: "OpenFlow Switch Specification" Version 1.1.0 Implemented (Wire Protocol 0x02), [online], [searched on Oct. 18, 2012], Internet <URL:http://www.openflow.org/documents/openflow-spec-v1.1.0.pdf>

SUMMARY

The following analysis has been given by the present inventor. As described in NPL 1, the VLAN ID field is a 12-bit field. Thus, there is a problem that the maximum number of manageable virtual networks is 4094. This problem is known as "the wall of the VLAN."

In particular, in the above cloud infrastructure, the wall of the VLAN is a constraint, which sets the upper limit of the number of manageable virtual networks. To increase this number of virtual networks to be over 4094, for example, it is necessary to connect a plurality of cloud infrastructures to each other, preventing efficient operations.

An object of the present invention is to provide a communication system, a virtual machine server, a virtual network management apparatus, a network control method, and a program. By increasing the number of manageable virtual networks in a communication system that provides virtual networks, efficiency of the communication system is increased.

According to a first aspect, there is provided a communication system, including: virtual machine servers on which virtual switches and virtual machines operate; a switch control apparatus configured to control the virtual switches; and a virtual network management apparatus configured to provide a function of managing a virtual network(s) that uses virtual switches and virtual machines that operate on the virtual machine servers. Each of the virtual machine servers includes: means for generating, when a virtual machine is connected to a virtual network via the virtual network management apparatus, local identification information unique per virtual switch and setting the local identification information as a VLAN ID of a port of a virtual switch, the port having been connected to the virtual machine; and means for notifying the virtual network management apparatus of a correspondence relationship between the virtual network to which the virtual machine has been connected and the local identification information. The virtual network management apparatus instructs, on the basis of the notification, the switch control apparatus to control the virtual network by using the local identification information unique per virtual switch as a match condition.

According to a second aspect, there is provided a virtual machine server, including: a hypervisor configured to control a virtual machine(s); a local identification information setting unit configured to generate, when a virtual machine is connected to a virtual network via a predetermined virtual network management apparatus, local identification information unique per virtual switch and set the local identification information as a VLAN ID of a port of a virtual switch, the port having been connected to the virtual machine; and a local identification information notification unit configured to notify the virtual network management apparatus of a correspondence relationship between the virtual network to which the virtual machine has been connected and the local identification information.

According to a third aspect, there is provided a virtual network management apparatus, which is connected to virtual machine servers on which virtual switches and virtual machines operate and to a switch control apparatus that controls the virtual switches and which provides a function of managing a virtual network(s) that uses the virtual switches and virtual machines, the virtual network management apparatus including: means for instructing, when receiving a notification including a correspondence relationship between local identification information unique per virtual switch and a virtual network to which a virtual machine is connected from one of the virtual machine servers, the switch control apparatus to control the virtual network by using the local identification information unique per virtual switch as a match condition.

According to a fourth aspect, there is provided a network control method, used in a communication system including: virtual machine servers on which virtual switches and virtual machines operate; a switch control apparatus configured to control the virtual switches; and a virtual network management apparatus configured to provide a function of managing a virtual network(s) that uses virtual switches and virtual machines that operate on the virtual machine servers, the network control method including steps of: causing one of the virtual machine servers to generate, when a virtual machine is connected to a virtual network via the virtual network management apparatus, local identification information unique per virtual switch and set the local identification information as a VLAN ID of a port of a virtual switch, the port having been connected to the virtual machine; causing the virtual machine server to notify the virtual network management apparatus of a correspondence relationship between the virtual network to which the virtual machine has been connected and the local identification information; and causing the virtual network management apparatus to instruct, on the basis of the notification, the switch control apparatus to control the virtual network by using the local identification information unique per virtual switch as a match condition. This method is associated with certain machines, namely, with virtual machine servers that provide virtual machines.

According to a fifth aspect, there are provided a program for realizing the functions of the above virtual machine server and a program for realizing the functions of the above virtual network management apparatus. Each of these programs can be recorded in a computer-readable (non-transient) storage medium. Namely, the present invention can be embodied as a computer program product.

The meritorious effects of the present invention are summarized as follows.

The present invention contributes to increasing the number of manageable virtual networks in a communication system that provides virtual networks and improving efficiency of the communication system.

BRIEF DESCRIPTION OF DRAWINGS

FIG. 7 illustrates exemplary entries stored in a VLAN mapping storage unit in a virtual machine server 10a according to the first exemplary embodiment of the present invention.

FIG. 8 illustrates exemplary entries stored in a VLAN mapping storage unit in a virtual machine server 10b according to the first exemplary embodiment of the present invention.

FIG. 11 illustrates exemplary entries stored in a VLAN mapping storage unit in a virtual machine server according to the second exemplary embodiment of the present invention.

FIG. 13 illustrates exemplary entries stored in a VLAN mapping storage unit in a virtual machine server according to a third exemplary embodiment of the present invention.

PREFERRED MODES

Figure 1:
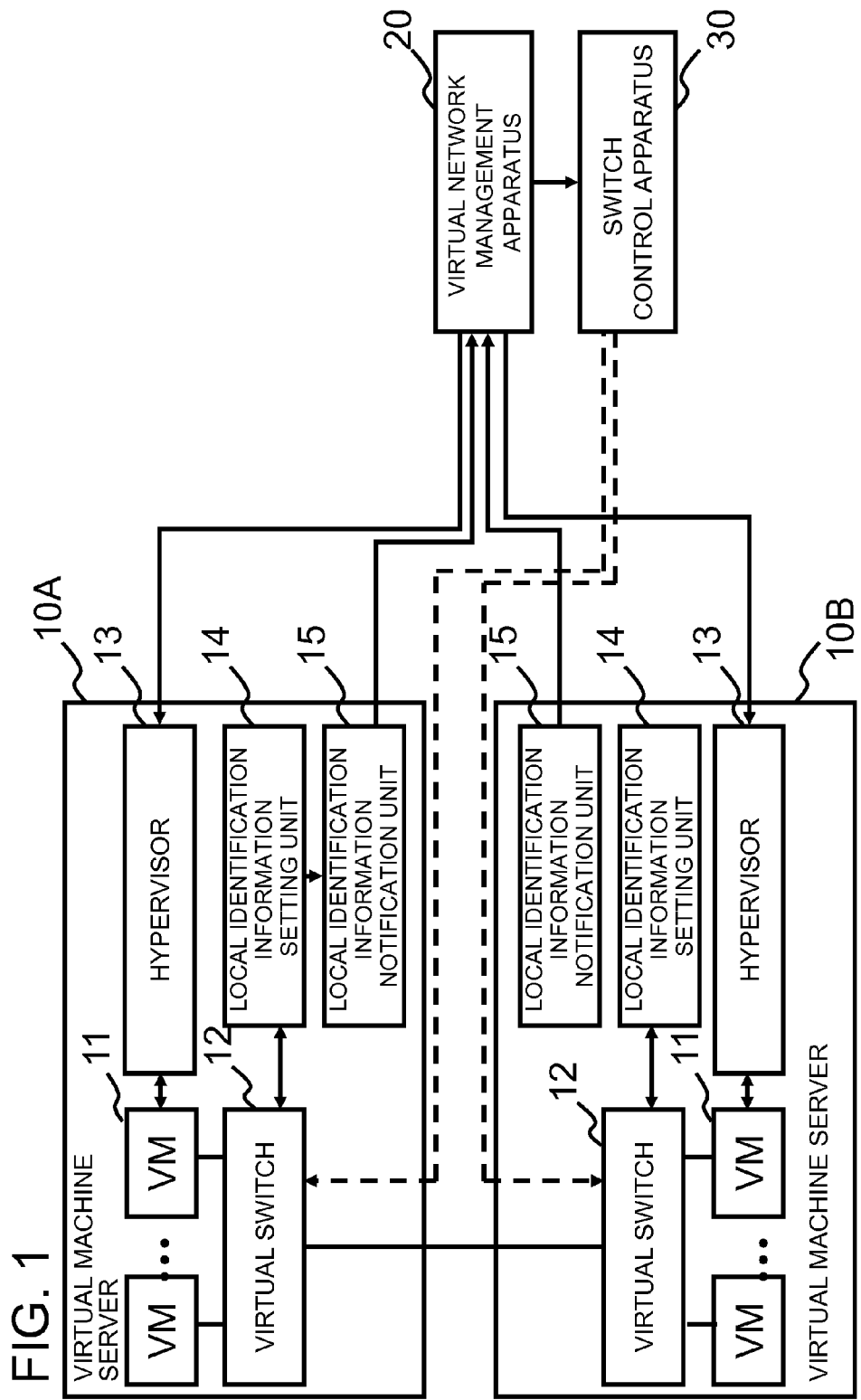
FIG. 1 illustrates a configuration according to an exemplary embodiment of the present invention.

First, an outline of an exemplary embodiment of the present invention will be described with reference to the drawings. In the following outline, various components are denoted by reference characters for the sake of convenience. Namely, the following reference characters are merely used as examples to facilitate understanding of the present invention, not to limit the present invention to the illustrated modes.

As illustrated in FIG. 1, an exemplary embodiment of the present invention can be realized by a configuration including: virtual machine servers 10A and 10B on which virtual switches 12 and virtual machines 11 operate; a virtual network management apparatus 20 that provides a function of managing virtual network(s) that uses virtual switches 12 and virtual machines 11 that operate on the virtual machine servers 10A and 10B; and a switch control apparatus 30 that controls the virtual switches 12. The virtual machine servers 10A and 10B, the virtual network management apparatus 20, and the switch control apparatus 30 are connected to each other.

More specifically, the virtual machine server 10A (10B) includes: a hypervisor 13 that manages the virtual machines 11; and means (a local identification information setting unit 14 in FIG. 1) for generating, when a virtual machine 11 is connected to a virtual network via the virtual network management apparatus 20, local identification information unique per virtual switch and setting the local identification information as a VLAN ID of a port of a virtual switch, the port having been connected to the virtual machine; and means (a local identification information notification unit 15 in FIG. 1) for notifying the virtual network management apparatus 20 of a correspondence relationship between the virtual network to which the virtual machine 11 has been connected and the local identification information.

On the basis of the notification, the virtual network management apparatus 20 instructs the switch control apparatus 30 to control the virtual network by using the local identification information unique per virtual switch as a match condition for identifying a packet. Of course, not only the local identification information but also a source address, a destination address, an ingress port, etc. can be specified as match conditions.

Figure 2:
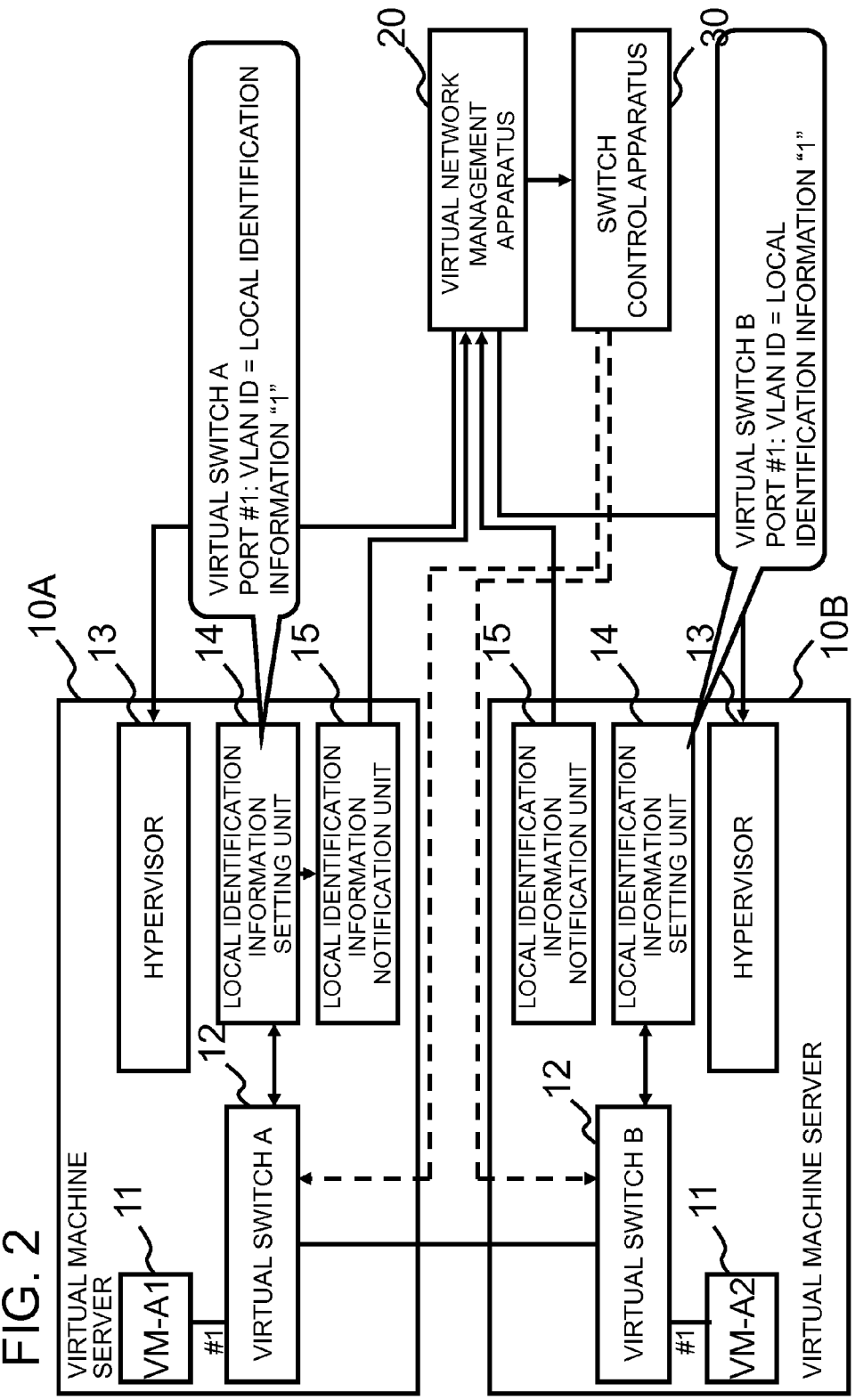
FIG. 2 illustrates an operation according to the exemplary embodiment of the present invention.

For example, the following description will be made assuming that virtual machines belonging to the same virtual network are connected to the respective virtual machine servers 10A and 10B. As illustrated in FIG. 2, when a virtual machine (VM-A1) 11 is connected to a virtual network via the virtual network management apparatus 20, the virtual machine server 10A generates local identification information "1" unique per virtual switch and sets the local identification information as a VLAN ID of port #1 of the virtual switch 12, port #1 having been connected to the virtual machine (VM-A1) 11. Likewise, as illustrated in the bottom in FIG. 2, when a virtual machine (VM-A2) is connected to the virtual network via the virtual network management apparatus 20, the virtual machine server 10B generates local identification information "1" unique per virtual switch and sets the local identification information as a VLAN ID of port #1 of the virtual switch 12, port #1 having been connected to the virtual machine (VM-A2) 11.

Next, the virtual machine server 10A notifies the virtual network management apparatus 20 that the local identification information "1" has been allocated to the virtual network to which the virtual machine 11 is connected. On the basis of the notification, the virtual network management apparatus 20 instructs the switch control apparatus 30 to control the virtual network by using the local identification information (=VLAN ID) "1" as a match condition regarding the virtual switch A.

Figure 3:
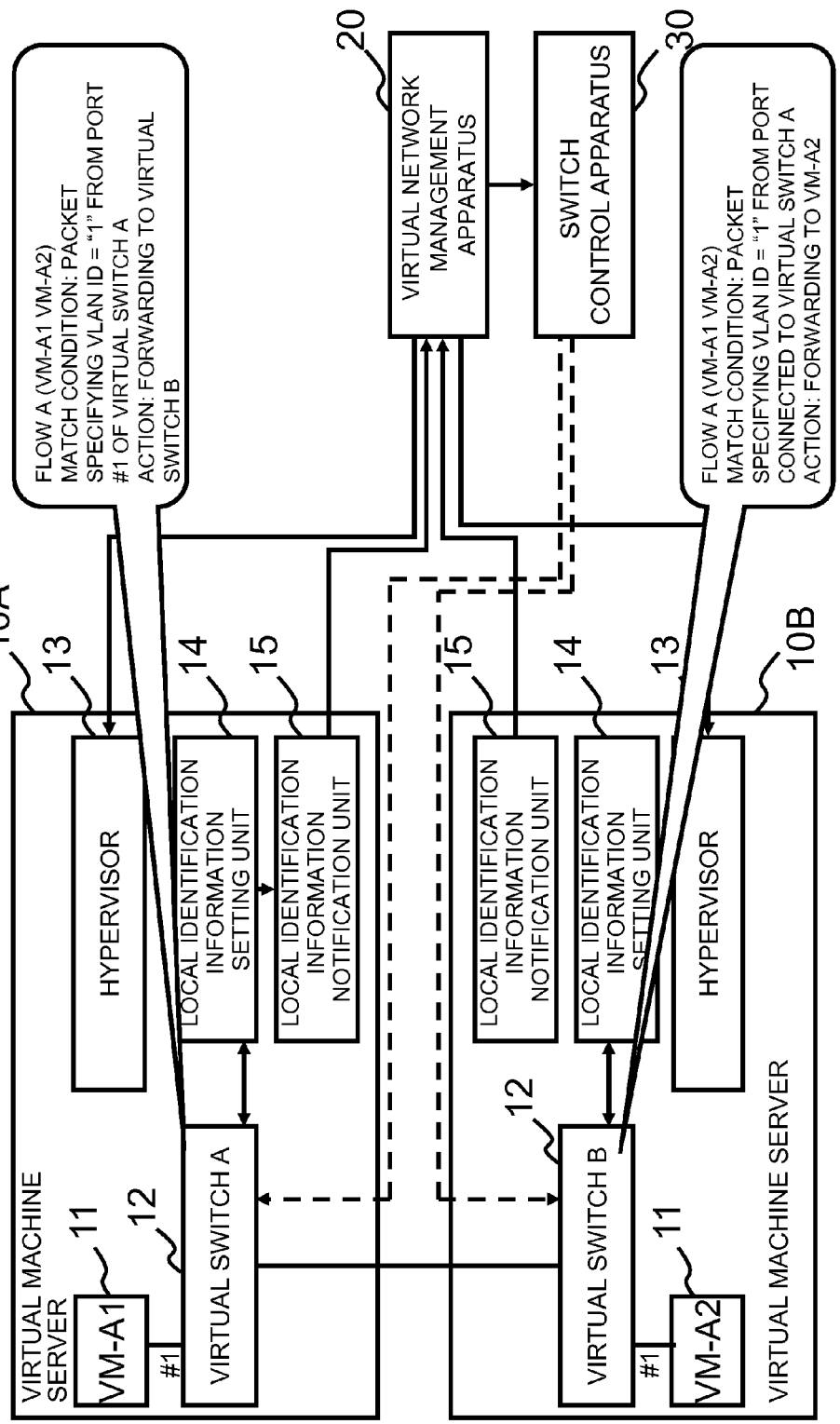
FIG. 3 illustrates an operation according to the exemplary embodiment of the present invention.

In accordance with the instruction from the virtual network management apparatus 20, the switch control apparatus 30 instructs the virtual switch A to forward packets whose VLAN ID (=local identification information) indicates "1" to the virtual switch B, as illustrated in FIG. 3. Likewise, the switch control apparatus 30 instructs the virtual switch B to forward packets whose VLAN ID (=local identification information) indicates "1" to the virtual machine (VM-A2) 11. In this way, packets are forwarded from the virtual machine (VM-A1) 11 to the virtual machine (VM-A2) 11.

Subsequently, when a virtual machine is connected, the virtual machine server 10A (10B) generates local identification information unique thereto and sets the local identification information as a VLAN ID of the corresponding virtual switch port. In addition, the virtual machine server 10A (10B) notifies the virtual network management apparatus 20 of a correspondence relationship (mapping) between the set local identification information and the virtual network.

Figure 4:
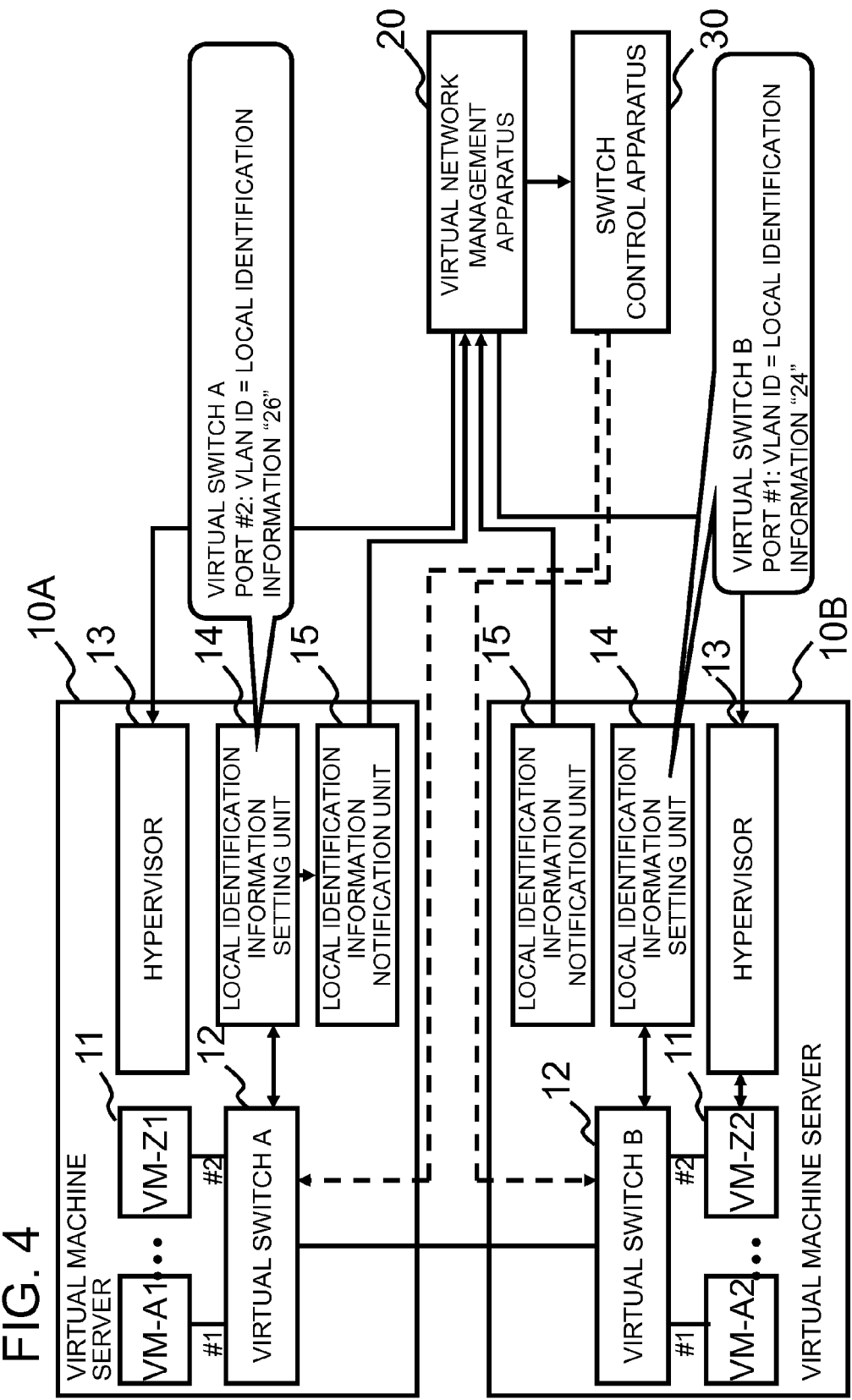
FIG. 4 illustrates an operation according to the exemplary embodiment of the present invention.

Since the local identification information is unique per virtual switch, the local identification information of a virtual machine (VM-Z1) connected to a virtual network and that of a virtual machine (VM-Z2) connected to the virtual network may not match, as illustrated in FIG. 4. However, since the virtual machine servers 10A and 10B also notify the virtual network management apparatus 20 of a correspondence relationship (mapping) between the virtual network and a virtual machine connected thereto, the virtual network management apparatus 20 can determine the virtual network and gives instructions to virtual switches that belong to the relevant virtual network about an appropriate match condition.

Figure 5:
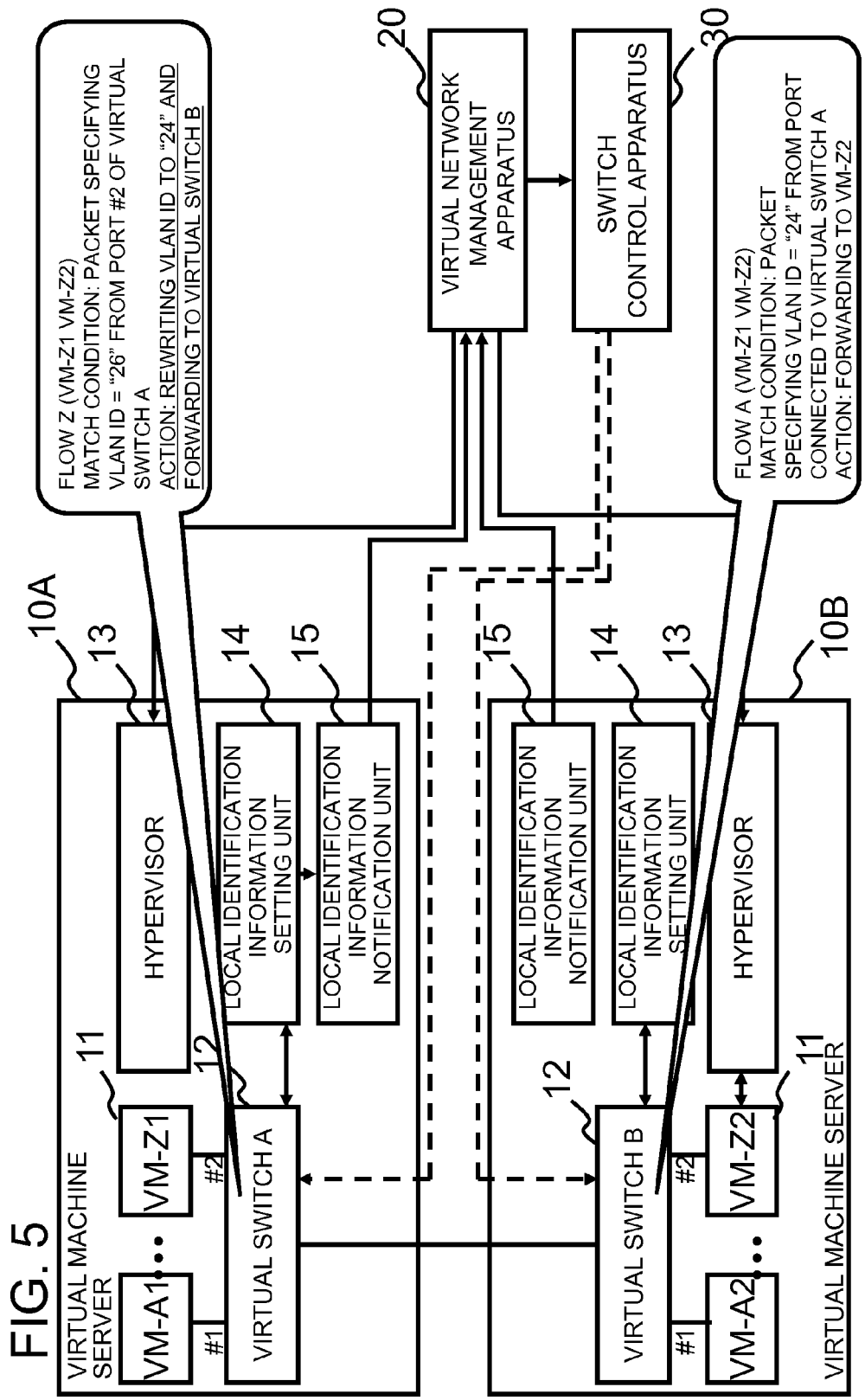
FIG. 5 illustrates an operation according to the exemplary embodiment of the present invention.

For example, as illustrated in FIG. 5, on the basis of an instruction from the virtual network management apparatus 20, the switch control apparatus 30 instructs the virtual switch A to perform packet forwarding or the like for packets from the virtual machine (VM-Z1) by using local identification information (=VLAN ID) "26" as a match condition. In this case, on the basis of an instruction from the virtual network management apparatus 20, if the local identification information (=VLAN ID) given to virtual machines that belong to the same virtual network between the virtual machine servers 10A and 10B is different, the switch control apparatus 30 instructs the virtual switch A to rewrite the VLAN ID ("26" to "24"), as illustrated in FIG. 5. In addition, the switch control apparatus 30 instructs the virtual switch B to perform packet forwarding or the like for packets from the virtual machine (VM-Z1) by using the local identification information (=VLAN ID) "24" as a match condition.

With the above configuration, the maximum number of virtual networks that can be recognized by a virtual machine serve is theoretically extended to "the number of virtual switches×"the number of patterns of local identification information (the number of VLAN IDs). Even such extension is made, since the network management apparatus 20 grasps a correspondence relationship between a virtual network and corresponding local identification information and the switch control apparatus 30 performs necessary header conversion, communication between virtual machines 11 can appropriately be controlled.

First Exemplary Embodiment

Figure 6:
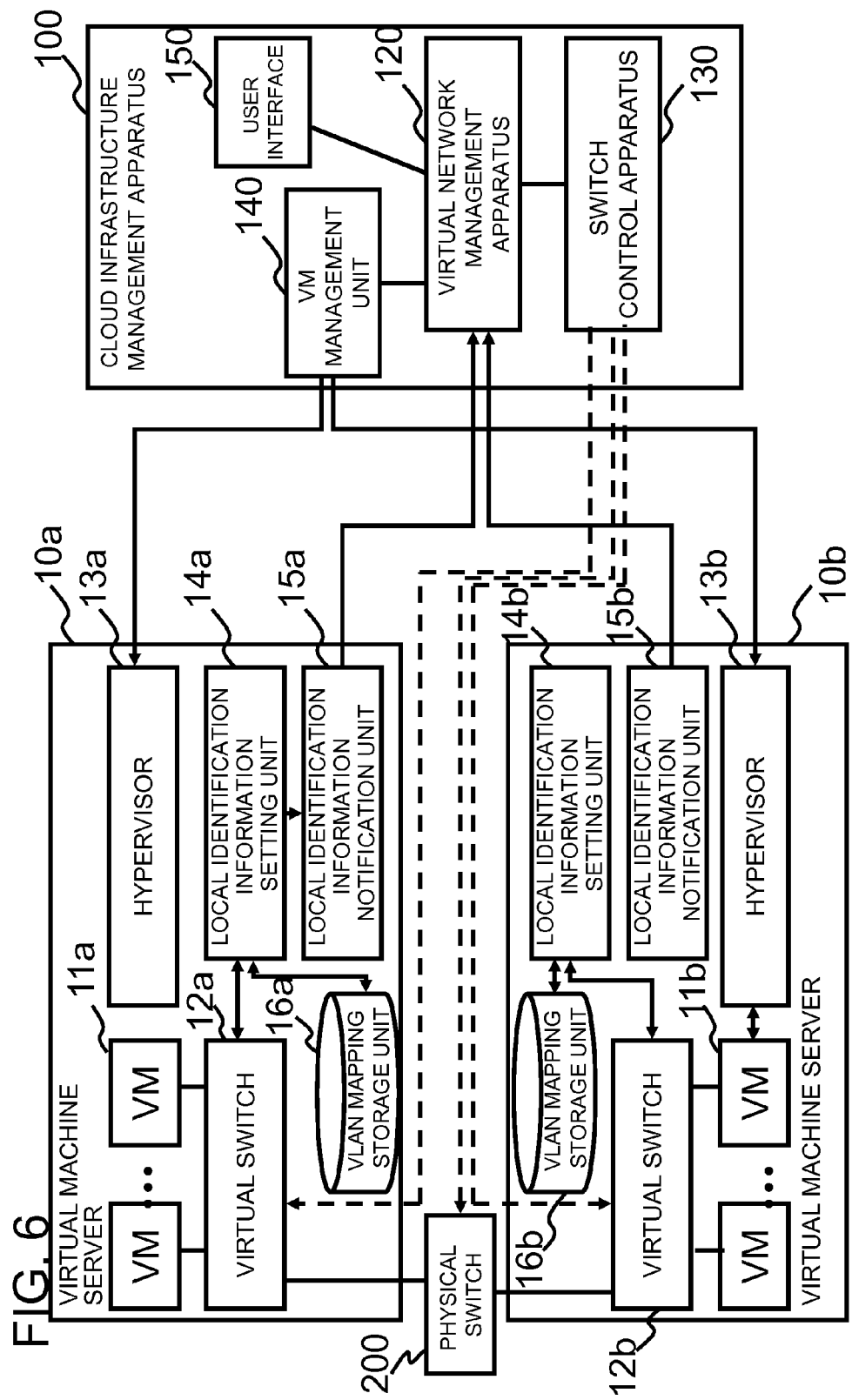
FIG. 6 illustrates a configuration of a communication system according to a first exemplary embodiment of the present invention.

Next, a first exemplary embodiment of the present invention will be described in detail with reference to the drawings. FIG. 6 illustrates a configuration of a communication system according to the first exemplary embodiment of the present invention. As illustrated in FIG. 6, virtual machine servers 10a and 10b connected to each other via a physical switch 200 and a cloud infrastructure management apparatus 100 are connected to each other. While the virtual machine servers 10a and 10b are connected to each other via the physical switch 200 in this example in FIG. 6, the virtual machine servers 10a and 10b may directly be connected to each other as illustrated in FIGS. 1 to 5.

The cloud infrastructure management apparatus 100 includes a virtual network management unit 120, a switch control unit 130 that corresponds to the above switch control apparatus 30, a VM management unit 140, and a user interface 150.

For example, the user interface 150 receives operations regarding configurations of virtual networks from user terminals (not illustrated).

The virtual network management unit 120 and the VM management unit 140 correspond to the above virtual network management apparatus 20. The virtual network management unit 120 receives operation contents regarding configurations of virtual networks via the user interface 150, and the VM management unit 140 communicates with hypervisors 13a and 13b in the respective virtual machine servers 10a and 10b for addition, change, deletion, etc. of virtual machines. In addition, when receiving a notification including a correspondence relationship (mapping) between a virtual network to which an added virtual machine has been connected and a VLAN ID from the virtual machine server 10a (10b), the virtual network management unit 120 instructs the switch control unit 130 to control relevant switches.

On the basis of the instruction from the virtual network management unit 120, the switch control unit 130 controls virtual switches 12a and 12b and the physical switch 200 and controls communication between virtual machines that belong to the same virtual network. A configuration that performs processing equivalent to that of an OpenFlow controller in NPLs 3 and 4 can be used as the switch control unit 130.

The virtual switch 12a (12b) and a virtual machine (VM) 11a (11b) operate on the virtual machine server 10a (10b) under the control of the hypervisor 13a (13b). The hypervisor 13a (13b) receives operations, such as about establishment of a virtual network and connection of a virtual machine, via the VM management unit 140 in the cloud infrastructure management apparatus 100. A virtual switch that performs packet processing equivalent to that of an OpenFlow switch in NPLs 3 and 4 can be used as the virtual switch 12a (12b).

In addition, the virtual machine server 10a (10b) includes a local identification information setting unit 14a (14b), a local identification information notification unit 15a (15b), and a VLAN mapping storage unit 16a (16b).

When a new virtual machine (VM) 11a (11b) is connected to the virtual switch 12a (12b) by the hypervisor 13a (13b), the local identification information setting unit 14a (14b) refers to the VLAN mapping storage unit 16a (16b) and determines whether to newly generate local identification information. If local identification information that corresponds to a virtual network to which the new virtual machine has been connected is found, the local identification information setting unit 14a (14b) sets the local identification information as a VLAN ID of a port of the virtual switch 12a (12b), the port having been connected to the new virtual machine (VM) 11a (11b). However, if no local identification information that corresponds to a virtual network to which the new virtual machine has been connected is found, the local identification information setting unit 14a (14b) generates local identification information that is unique per virtual switch and sets the local identification information as a VLAN ID of a port of the virtual switch 12a (12b), the port having been connected to the virtual machine (VM) 11a (11b). The local identification information setting unit 14a (14b) registers a correspondence relationship between the newly set local identification information and the virtual network in the VLAN mapping storage unit 16a (16b).

The local identification information notification unit 15a (15b) notifies the cloud infrastructure management apparatus 100 of the local identification information that corresponds to the virtual network to which the virtual machine 11a (11b) has been connected.

FIGS. 7 and 8 illustrate exemplary entries stored in the VLAN mapping storage units 16a and 16b, respectively. In each entry, a virtual network and corresponding local identification information are associated with each other per virtual switch. FIG. 7 illustrates exemplary entries stored in the VLAN mapping storage unit 16a in the virtual machine server 10a. In FIG. 7, identification information 12a given to the virtual switch that operates on the virtual machine server 10a, a virtual network ID supplied by the virtual network management unit 120, and local identification information generated by the local identification information setting unit 14a are associated with each other and stored.

FIG. 8 illustrates exemplary entries stored in the VLAN mapping storage unit 16b in the virtual machine server 10b. In FIG. 8, identification information 12b given to the virtual switch that operates on the virtual machine server 10b, a virtual network ID supplied by the virtual network management unit 120, and local identification information (VLAN ID) generated by the local identification information setting unit 14b are associated with each other and stored. When FIGS. 7 and 8 are compared, the same local identification information (VLAN ID) is used regarding virtual networks 1 and 2. Thus, the virtual network management unit 120 in the cloud infrastructure management apparatus 100 does not need to give an instruction for converting the VLAN IDs.

In contrast, FIG. 7 includes an entry in which the local identification information (VLAN ID) representing 3 is associated with the virtual network representing 3, and FIG. 8 includes an entry in which the local identification information (the VLAN ID) representing 3 is associated with the virtual network representing 5. While the local identification information (VLAN ID) is the same between these entries, the cloud infrastructure management apparatus 100 recognizes different virtual networks on the basis of virtual switches to which the virtual machines are connected and the corresponding port information.

In addition, FIG. 7 includes an entry in which the local identification information (VLAN ID) representing 3 is associated with the virtual network representing 3, and FIG. 8 includes an entry in which the local identification information (VLAN ID) representing 4 is associated with the virtual network representing 3. While the local identification information (VLAN ID) is different, the cloud infrastructure management apparatus 100 recognizes the same virtual network on the basis of the virtual switches to which the virtual machines are connected and the corresponding port information. In this case, the virtual network management unit 120 in the cloud infrastructure management apparatus 100 gives an instruction for converting one of the VLAN IDs to one of the virtual switches on the corresponding path.

By using local identification information (VLAN ID) unique per virtual switch, a corresponding virtual switch, and corresponding port information in this way, the virtual switch 12*a* in FIG. 7 can recognize up to 4094 types of virtual networks, which is the number of patterns of local identification information (VLAN IDs). Likewise, the virtual switch 12*b* in FIG. 8 can also recognize up to 4094 types of virtual networks, which is the number of patterns of local identification information (VLAN IDs). However, since the different local identification information (VLAN ID) can be given to the same virtual network, more than 4094 virtual networks can be managed in the whole system, as illustrated in FIG. 8.

In addition, each entry in FIG. 7 (8) illustrates a correspondence relationship between a virtual network and local identification information (VLAN ID) of the virtual switch 12*a* (12*b*). However, if a plurality of virtual switches 12*a* (12*b*) are arranged in the virtual machine server 10*a* (10*b*), each correspondence relationship between a virtual network to which a VM connected to a port of one of these virtual switches belongs and corresponding local identification information (VLAN ID) may be stored.

Each unit (processing means) of the virtual machine servers 10*a* and 10*b* and the cloud infrastructure management apparatus illustrated in FIG. 6 can be realized by a computer program which causes a computer that constitutes a corresponding one of the virtual machine servers 10*a* and 10*b* and the cloud infrastructure management apparatus to use its hardware and execute the corresponding processing described above.

Figure 9:
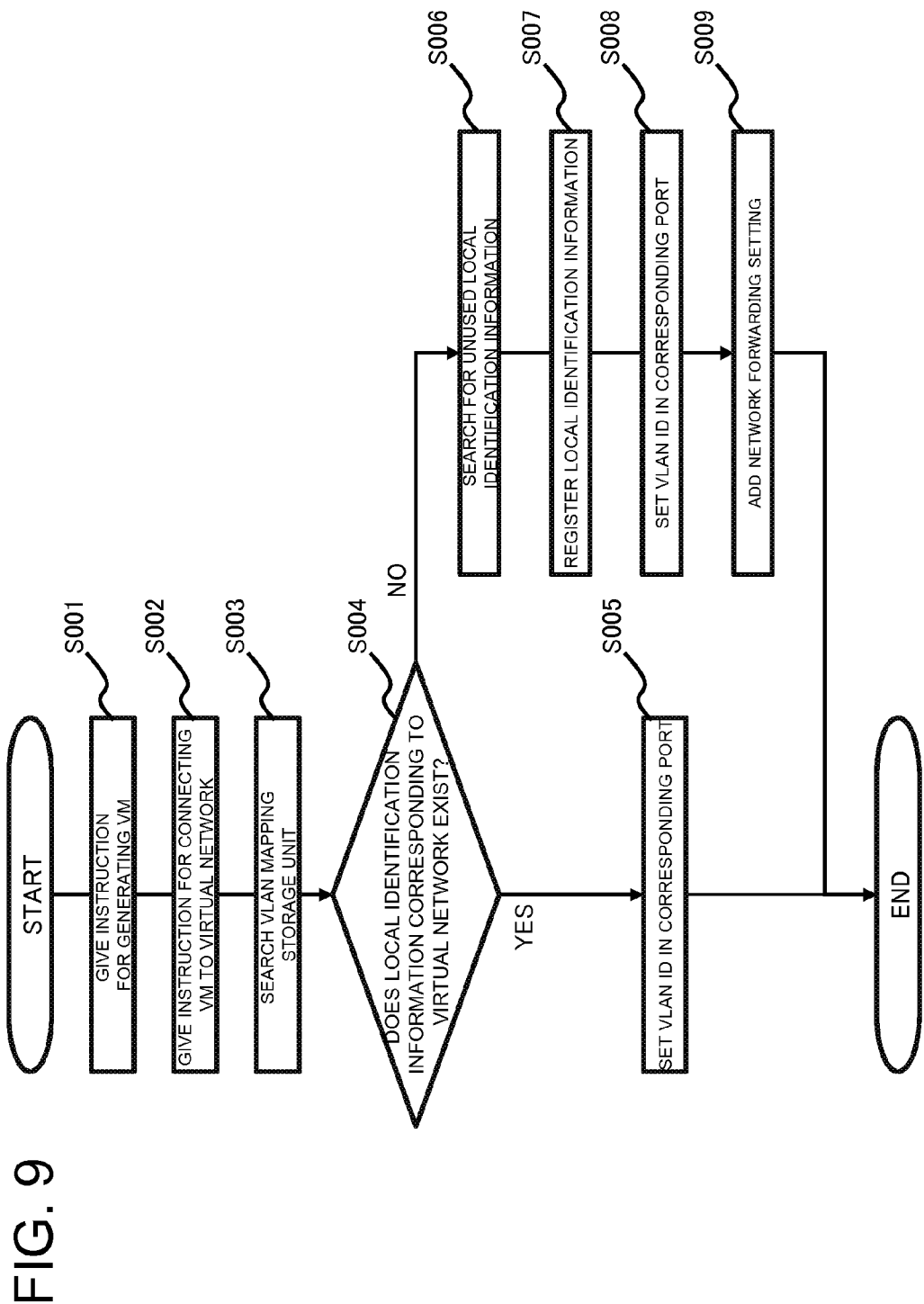
FIG. 9 is a flowchart illustrating an operation in the communication system according to the first exemplary embodiment of the present invention.

Next, an operation according to the present exemplary embodiment will be described in detail with reference to the drawings. FIG. 9 is a flowchart illustrating an operation in the communication system according to the first exemplary embodiment of the present invention. First, when the user interface 150 in the cloud infrastructure management apparatus 100 receives a VM generation request from a user, the VM management unit 140 instructs the hypervisor 13*a* (13*b*) to generate a VM (step S001).

Next, the hypervisor 13*a* (13*b*) instructs the local identification information setting unit 14*a* (14*b*) to connect the generated VM to a virtual network (step S002).

The local identification information setting unit 14*a* (14*b*) searches the VLAN mapping storage unit 16*a* (16*b*) for local identification information (VLAN ID) corresponding to the virtual network (step S003).

If, as a result of the search, the local identification information setting unit 14*a* (14*b*) finds local identification information (a VLAN ID) corresponding to the virtual network to which the newly generated VM has been connected (YES in step S004), the local identification information setting unit 14*a* (14*b*) sets the local identification information as a VLAN ID of a port of the virtual switch, the port having been connected to the VM (step S005).

However, if, as a result of the search, the local identification information setting unit 14*a* (14*b*) does not find local identification information (VLAN ID) corresponding to the virtual network to which the newly generated VM has been connected (NO in step S004), the local identification information setting unit 14*a* (14*b*) generates unused local identification information (step S006). The local identification information setting unit 14*a* (14*b*) can acquire unused local identification information by sequentially searching the local identification information field in the VLAN mapping storage unit 16*a* (16*b*), for example. If the local identification information setting unit 14*a* (14*b*) does not fine any unused local identification information, the local identification information setting unit 14*a* (14*b*) may perform appropriate exception processing, such as deletion of unnecessary local identification information.

Next, the local identification information setting unit 14*a* (14*b*) registers an entry indicating a correspondence relationship between the generated local identification information and the virtual network in the VLAN mapping storage unit 16*a* (16*b*) (step S007). Next, the local identification information setting unit 14*a* (14*b*) sets the generated local identification information as a VLAN ID of the corresponding virtual switch port to which the VM has been connected (step S008).

Next, the local identification information notification unit 15*a* (15*b*) notifies the network management unit 120 in the cloud infrastructure management apparatus 100 of the local identification information corresponding to the virtual network to which the generated virtual machine has been connected. The virtual network management unit 120 in the cloud infrastructure management apparatus 100 forwards the received content to the switch control unit 130. On the basis of the notification, the switch control unit 130 adds a forwarding setting to each virtual switch and physical switch that constitute the virtual network. More specifically, the switch control unit 130 adds a forwarding setting to each of the virtual switches so that, when one of the virtual switches receives a packet in which the local identification information is set as a VLAN ID, the virtual switch forwards the packet to a VM that belongs to the same virtual network or rewrites the local identification information (VLAN ID) as needed (step S009; see FIGS. 3 and 5).

As described above, according to the first exemplary embodiment, local identification information (VLAN ID) is allocated to a virtual network per virtual switch, and the switch control unit 130 is configured to perform flow control by using the local identification information (VLAN ID) allocated per virtual switch. Consequently, the cloud infrastructure management apparatus 100 can manage more than 4094 virtual networks.

Second Exemplary Embodiment

Figure 10:
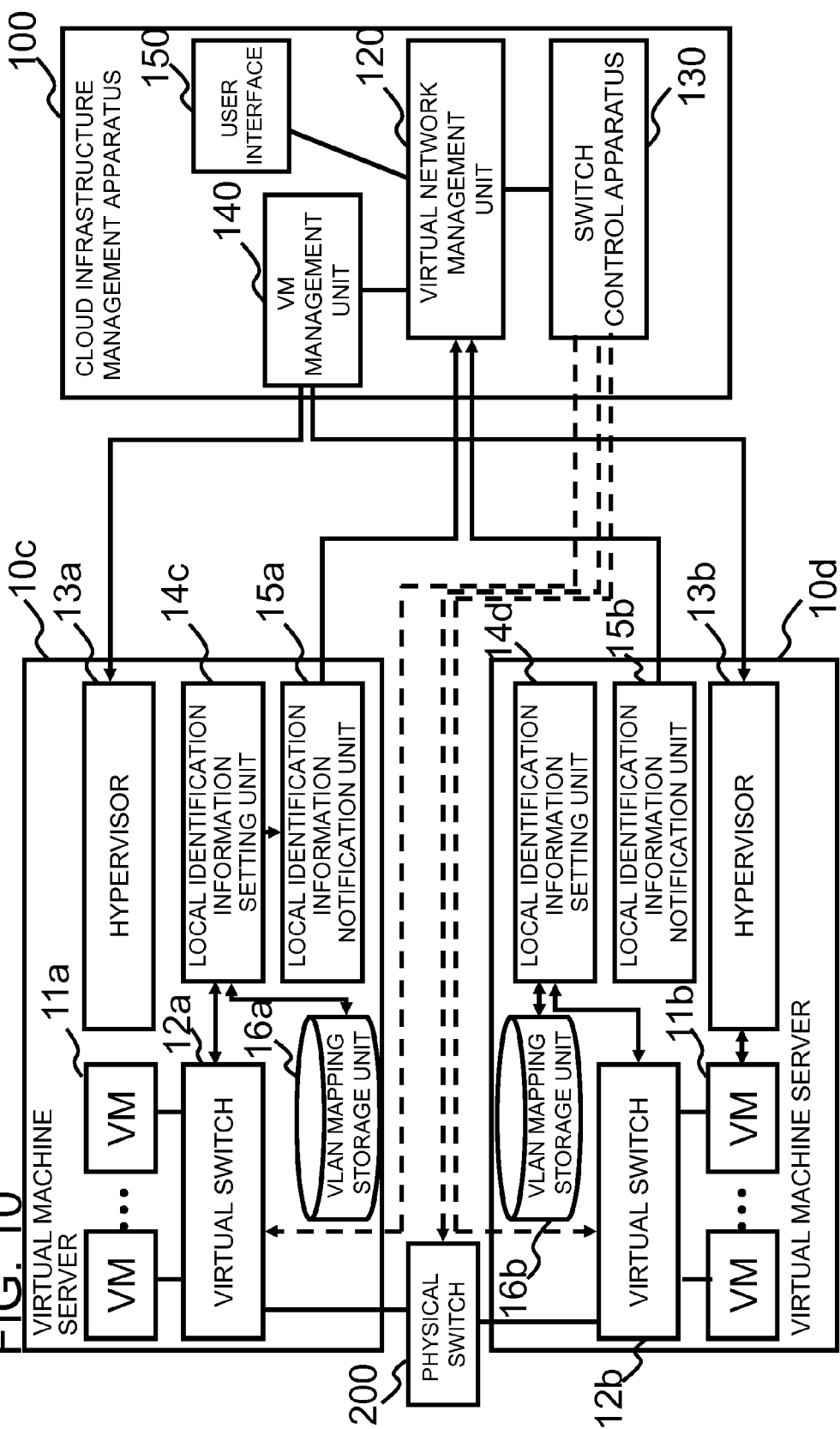
FIG. 10 illustrates a configuration of a communication system according to a second exemplary embodiment of the present invention.

Next, a second exemplary embodiment will be described. The second exemplary embodiment differs from the above first exemplary embodiment in that how local identification information (VLAN ID) is generated. FIG. 10 illustrates a configuration of a communication system according to the second exemplary embodiment of the present invention. The second exemplary embodiment differs from the first exemplary embodiment illustrated in FIG. 6 in that how local identification information is generated by the local identification information setting unit. Since other configurations are the same as those according to the first exemplary embodiment, the following description will be made with a focus on the difference.

When the new virtual machine (VM) 11a (11b) is connected to the virtual switch 12a (12b) by the hypervisor 13a (13b), a local identification information setting unit 14c (14d) in a virtual machine server 10c (10d) according to the second exemplary embodiment of the present invention refers to the VLAN mapping storage unit 16a (16b) and determines whether to newly generate local identification information. If the local identification information setting unit 14c (14d) does not find local identification information corresponding to the virtual network to which the new virtual machine has been connected, the local identification information setting unit 14a (14b) generates local identification information by converting the corresponding virtual network ID by using a predetermined rule. Next, after determining whether the generated local identification information overlaps any existing local identification information (namely, whether uniqueness is ensured), the local identification information setting unit 14a (14b) sets the local identification information as a VLAN ID of a port of the virtual switch 12a (12b), the port having been connected to the virtual machine (VM) 11a (11b).

FIG. 11 illustrates exemplary entries stored in the VLAN mapping storage unit 16a (16b) in the virtual machine server 10c (10d) according to the second exemplary embodiment of the present invention. In the example in FIG. 11, a unique integer that can be used as local identification information (VLAN ID) is generated from the corresponding virtual network ID indicated in hexadecimal notation. More specifically, a virtual network ID is converted into an integer, which is to be divided by 0x1000. The remainder is used as a VLAN ID. The reason why the local identification information (VLAN ID) corresponding to virtual network ID=0x1001 is "2" will be described below.

It is desirable that a plurality of virtual switches (virtual machine servers) share such method (rule, function) for generating local identification information from the corresponding virtual network ID. In such way, since the probability that local identification information generated uniquely in each virtual switch matches is increased, virtual switches need to rewrite VLAN IDs less frequently.

Figure 12:
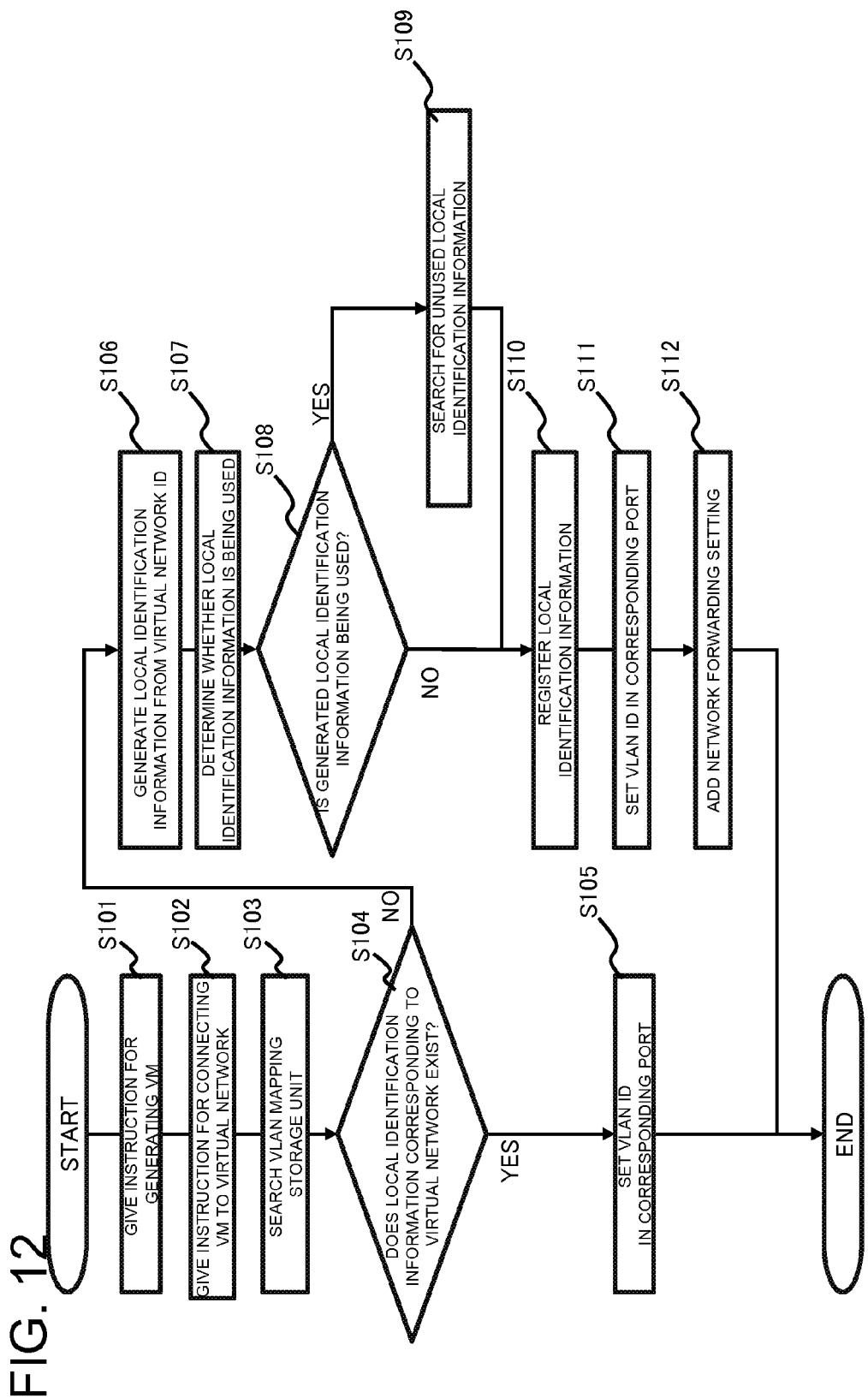
FIG. 12 is a flowchart illustrating an operation in the communication system according to the second exemplary embodiment of the present invention.

Next, an operation according to the present exemplary embodiment will be described in detail with reference to the drawings. FIG. 12 is a flowchart illustrating an operation in the communication system according to the second exemplary embodiment of the present invention. Since steps S101 to S105 in FIG. 12 are the same as steps S001 to S005 in FIG. 9, redundant description thereof will be omitted.

As a result of the search in step S104, if the local identification information setting unit 14c (14d) does not find local identification information (VLAN ID) corresponding to the virtual network to which the newly generated VM has been connected, the local identification information setting unit 14c (14d) generates local identification information from the corresponding virtual network ID (step S106). Next, the local identification information setting unit 14c (14d) refers to the VLAN mapping storage unit 16a (16b) and determines whether the same local identification information as the generated local identification information is being used (whether the same local identification information has already been generated) (step S107). If the newly generated local identification information (VLAN ID) is being used (has already been generated) (YES in step S108), the local identification information setting unit 14c (14d) generates unique local identification information by using a method (second method) different from the local identification information generation method in step S106 (step S109). As the second method, for example, unused local identification information may be searched for sequentially as described in the first exemplary embodiment. Alternatively, another calculation method or function may be used to obtain local identification information from the virtual network ID.

For example, as illustrated in FIG. 11, first, if a VM that belongs to a certain virtual network ID 0x1 is generated, the local identification information setting unit 14c (14d) divides 0x1 by 0x1000 and allocates remainder "1" as the corresponding VLAN ID. Next, if a VM that belongs to a virtual network ID 0x3 is generated, the local identification information setting unit 14c (14d) divides 0x3 by 0x1000 and allocates remainder "3" as the corresponding VLAN ID. Next, if a VM that belongs to a virtual network ID 0x1001 is generated, the local identification information setting unit 14c (14d) divides 0x1001 by 0x1000 and generates remainder 1 as the corresponding VLAN ID. However, in this case, VLAN ID=1 has already been allocated to the virtual network ID 0x1. Thus, the local identification information setting unit 14c (14d) allocates "2" as the corresponding VLAN ID by using the second method in which an unused VLAN ID is searched for sequentially from the start, for example.

As a result of the search, if the local identification information setting unit 14c (14d) does not find newly generated local identification information (VLAN ID) (NO in step S108), the local identification information setting unit 14c (14d) registers an entry indicating a correspondence relationship between the generated local identification information and the virtual network in the VLAN mapping storage unit 16a (16b) (step S110). Next, the local identification information setting unit 14c (14d) sets the generated local identification information as a VLAN ID of the port of the virtual switch, the port having been connected to the VM (step S111).

Next, the local identification information notification unit 15a (15b) notifies the network management unit 120 in the cloud infrastructure management apparatus 100 of the local identification information that corresponds to the virtual network to which the generated virtual machine has been connected. The virtual network management unit 120 in the cloud infrastructure management apparatus 100 forwards the received content to the switch control unit 130. On the basis of the notification, the switch control unit 130 adds a forwarding setting to each virtual switch and physical switch so that a virtual network is configured. More specifically, the switch control unit 130 adds a forwarding setting to each virtual switch so that, when a virtual switch receives a packet in which the local identification information is set as a VLAN ID, the virtual switch forwards the packet to a VM that belongs to the same virtual network or rewrites the local identification information (VLAN ID) as needed (step S112; see FIGS. 3 and 5).

As described above, the second exemplary embodiment of the present invention provides an advantageous effect in that processing for searching unused local identification information (VLAN ID) is performed more efficiently than that according to the first exemplary embodiment. In addition, as described above, by calculating a remainder obtained by dividing a virtual network ID by a number larger than 4096, it is possible to obtain a VLAN ID different from a previously allocated VLAN ID until the number of virtual networks reaches 4094, counted as another advantageous effect.

In addition, by previously determining a method (rule, function) for generating local identification information from a virtual network ID as described above, the probability that mapping of VLAN IDs allocated to a single virtual network matches is increased. As a result, virtual switches and a physical switch on a packet forwarding path rewrite VLAN IDs less frequently.

While exemplary embodiments of the present invention have thus been described, the present invention is not limited thereto. Further variations, substitutions, or adjustments can be made without departing from the basic technical concept of the present invention. For example, a network configuration or an element configuration illustrated in each drawing is used only as an example to facilitate understanding of the present invention. Namely, the present invention is not limited to the configurations illustrated in the drawings.

For example, the above exemplary embodiments have been described assuming that the cloud infrastructure management apparatus 100 includes the switch control unit 130 performing switching control and corresponding to an OpenFlow controller in NPLs 3 and 4, the present invention is also applicable to other cloud infrastructure platforms. For example, the present invention is also applicable to a network in which a control server or the like performs centralized network management.

In addition, for example, instead of the local identification information generation method described in the second exemplary embodiment, local identification information may be obtained from a hash value (Hash (network ID)) of a virtual network ID, as illustrated in FIG. 13 (a third exemplary embodiment).

Finally, suitable modes of the present invention will be summarized.

[Mode 1]
(See the communication system according to the above first aspect)

[Mode 2]
The communication system according to mode 1;
wherein, if different items of local identification information are allocated to a single virtual network, the switch control apparatus instructs at least one of the virtual switches to rewrite a VLAN ID of a corresponding packet.

[Mode 3]
The communication system according to mode 1 or 2;
wherein each of the virtual machine servers includes a mapping information storage unit in which a virtual network and local identification information are associated with each other for each of the virtual switches;
wherein, when a virtual machine is arranged for one of the virtual switches, the corresponding virtual machine server searches the mapping storage unit for local identification information associated with a virtual network to which the virtual machine belongs; and
wherein, if local identification information associated with the virtual network is stored in the mapping storage unit, the virtual machine server notifies the virtual network management apparatus of the already-generated local identification information as a VLAN ID.

[Mode 4]
The communication system according to any one of modes 1 to 3;
wherein each of the virtual machine servers generates local identification information by converting a virtual network ID on the basis of a predetermined rule.

[Mode 5]
The communication system according to any one of modes 1 to 3;
wherein each of the virtual machine servers generates local identification information by converting a virtual network ID on the basis of a predetermined hash function.

[Mode 6]
The communication system according to mode 4 or 5;
wherein a plurality of virtual switches share the rule or function for generating local identification information from a virtual network ID.

[Mode 7]
(See the virtual machine server according to the above second aspect)

[Mode 8]
(See the virtual network management apparatus according to the above third aspect)

[Mode 9]
(See the network control method according to the above fourth aspect)

[Modes 10 and 11]
(See the program according to the above fifth aspect)

The above modes 7 to 11 can be expanded in the same way as mode 1 is expanded to modes 2 to 6.

The disclosure of each of the above PTL and NPLs is incorporated herein by reference thereto. Modifications and adjustments of the exemplary embodiments and the examples are possible within the scope of the overall disclosure (including the claims) of the present invention and based on the basic technical concept of the present invention. In addition, various combinations and selections of various disclosed elements (including the elements in each of the claims, exemplary embodiments, examples, drawings, etc.) are possible within the scope of the claims of the present invention. Namely, the present invention of course includes various variations and modifications that could be made by those skilled in the art according to the overall disclosure including the claims and the technical concept. In particular, the present description discloses numerical value ranges. However, even if the description does not particularly disclose arbitrary numerical values or small ranges included in the ranges, these values and ranges should be deemed to have been specifically disclosed.

REFERENCE SIGNS LIST 10A, 10B, 10a, 10b, 10c, 10d virtual machine server
11, 11a, 11b virtual machine
12, 12a, 12b virtual switch
13, 13a, 13b hypervisor
14, 14a, 14b, 14c, 14d local identification information setting unit
15, 15a, 15b local identification information notification unit
16a, 16b VLAN mapping storage unit
20 virtual network management apparatus
30 switch control apparatus
100 cloud infrastructure management apparatus
120 virtual network management unit
130 switch control unit
140 VM management unit
150 user interface
200 physical switch

What is claimed is:
1. A communication system, comprising:
virtual machine servers on which virtual switches and virtual machines operate;

a switch control apparatus having a first processor and first memory storing first computer-executable code that the first processor executes to control the virtual switches; and
a virtual network management apparatus having a second processor and second memory storing second computer-executable code that the second processor executes to provide a function of managing a virtual network(s) that uses virtual switches and virtual machines that operate on the virtual machine servers;
wherein each of the virtual machine servers comprises:
a third processor;
a third memory storing third computer-executable code that the third processor executes to:
when a virtual machine is connected to a virtual network via the virtual network management apparatus, generate local identification information unique per virtual switch and set the local identification information as a VLAN ID of a port of a virtual switch, the port having been connected to the virtual machine; and
notify the virtual network management apparatus of a correspondence relationship between the virtual network to which the virtual machine has been connected and the local identification information; and
wherein the virtual network management apparatus instructs, on the basis of the notification, the switch control apparatus to control the virtual network by using the local identification information unique per virtual switch as a match condition.

2. The communication system according to claim 1;
wherein, if different items of local identification information are allocated to a single virtual network, the switch control apparatus instructs at least one of the virtual switches to rewrite a VLAN ID of a corresponding packet.

3. The communication system according to claim 2;
wherein each of the virtual machine servers comprises storage hardware storing mapping information in which a virtual network and local identification information are associated with each other for each of the virtual switches;
wherein, when a virtual machine is arranged for one of the virtual switches, the corresponding virtual machine server searches the mapping information for local identification information associated with a virtual network to which the virtual machine belongs; and
wherein, if local identification information associated with the virtual network is stored in the mapping information, the virtual machine server notifies the virtual network management apparatus of the already-generated local identification information as a VLAN ID.

4. The communication system according to claim 2;
wherein each of the virtual machine servers generates local identification information by converting a virtual network ID on the basis of a predetermined rule.

5. The communication system according to claim 2;
wherein each of the virtual machine servers generates local identification information by converting a virtual network ID on the basis of a predetermined hash function.

6. The communication system according to claim 1;
wherein each of the virtual machine servers comprises storage hardware storing mapping information in which a virtual network and local identification information are associated with each other for each of the virtual switches;
wherein, when a virtual machine is arranged for one of the virtual switches, the corresponding virtual machine server searches the mapping information for local identification information associated with a virtual network to which the virtual machine belongs; and
wherein, if local identification information associated with the virtual network is stored in the mapping information, the virtual machine server notifies the virtual network management apparatus of the already-generated local identification information as a VLAN ID.

7. The communication system according to claim 6;
wherein each of the virtual machine servers generates local identification information by converting a virtual network ID on the basis of a predetermined rule.

8. The communication system according to claim 6;
wherein each of the virtual machine servers generates local identification information by converting a virtual network ID on the basis of a predetermined hash function.

9. The communication system according to claim 1;
wherein each of the virtual machine servers generates local identification information by converting a virtual network ID on the basis of a predetermined rule.

10. The communication system according to claim 9;
wherein a plurality of virtual switches share the rule or function for generating local identification information from a virtual network ID.

11. The communication system according to claim 1;
wherein each of the virtual machine servers generates local identification information by converting a virtual network ID on the basis of a predetermined hash function.

12. The communication system according to claim 11;
wherein a plurality of virtual switches share the rule or function for generating local identification information from a virtual network ID.

13. A virtual machine server, comprising:
a processor; and
memory storing computer-executable code executable by the processor and including a hypervisor configured to control a virtual machine(s),
wherein the code is executable by the processor to:
generate, when a virtual machine is connected to a virtual network via a predetermined virtual network management apparatus, local identification information unique per virtual switch and set the local identification information as a VLAN ID of a port of a virtual switch, the port having been connected to the virtual machine; and
notify the virtual network management apparatus of a correspondence relationship between the virtual network to which the virtual machine has been connected and the local identification information.

14. A virtual network management apparatus, which is connected to virtual machine servers on which virtual switches and virtual machines operate and to a switch control apparatus that controls the virtual switches and which provides a function of managing a virtual network(s) that uses the virtual switches and virtual machines, the virtual network management apparatus comprising:
a processor; and
memory storing computer-executable code executable by the processor to when receiving a notification including a correspondence relationship between local identification information unique per virtual switch and a virtual network to which a virtual machine is connected from one of the virtual machine servers, instruct the switch control apparatus to control the virtual network by using the local identification information unique per virtual switch as a match condition.

15. A network control method used in a communication system including: virtual machine servers on which virtual switches and virtual machines operate; a switch control apparatus configured to control the virtual switches; and a virtual network management apparatus configured to provide a function of managing a virtual network(s) that uses virtual switches and virtual machines that operate on the virtual machine servers, the network control method comprising:

causing one of the virtual machine servers to generate, when a virtual machine is connected to a virtual network via the virtual network management apparatus, local identification information unique per virtual switch and set the local identification information as a VLAN ID of a port of a virtual switch, the port having been connected to the virtual machine;

causing the virtual machine server to notify the virtual network management apparatus of a correspondence relationship between the virtual network to which the virtual machine has been connected and the local identification information; and causing the virtual network management apparatus to instruct, on the basis of the notification, the switch control apparatus to control the virtual network by using the local identification information unique per virtual switch as a match condition.

16. A non-transitory computer-readable recording medium storing thereon a program, causing a computer, which is mounted on a virtual machine server comprising a hypervisor that controls an operation of a virtual machine(s), to perform processing for:

generating, when a virtual machine is connected to a virtual network via a virtual network management apparatus that provides a function of managing a virtual network(s) that uses virtual machines and virtual switches that operates on the virtual machine server, local identification information unique per virtual switch and setting the local identification information as a VLAN ID of a port of a virtual switch, the port having been connected to the virtual machine; and notifying the virtual network management apparatus of a correspondence relationship between the virtual network to which the virtual machine has been connected and the local identification information.

17. A non-transitory computer-readable recording medium storing thereon a program, causing a computer, mounted on a virtual network management apparatus which is connected to virtual machine servers on which virtual switches and virtual machines operate and to a switch control apparatus that controls the virtual switches and which provides a function of managing a virtual network(s) that uses the virtual switches and virtual machines, to perform processing for:

receiving a correspondence relationship between local identification information unique per virtual switch and a virtual network to which one of the virtual machines is connected from one of the virtual machine servers; and instructing the switch control apparatus to control the virtual network by using the local identification information unique per virtual switch as a match condition.

* * * * *